US010282701B2

(12) United States Patent
Messer

(10) Patent No.: US 10,282,701 B2
(45) Date of Patent: May 7, 2019

(54) WEB-BASED TECHNICAL ISSUE ASSIGNMENTS BASED ON TECHNICAL SUPPORT GROUPS HAVING HANDLED A HIGHEST NUMBER OF TECHNICAL REQUESTS

(75) Inventor: Martin Messer, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1510 days.

(21) Appl. No.: 11/943,221

(22) Filed: Nov. 20, 2007

(65) Prior Publication Data

US 2009/0132307 A1     May 21, 2009

(51) Int. Cl.
*G06Q 10/10*     (2012.01)

(52) U.S. Cl.
CPC .................................. *G06Q 10/10* (2013.01)

(58) Field of Classification Search
None
See application file for complete search history.

(56) References Cited

U.S. PATENT DOCUMENTS

| | | | |
|---|---|---|---|
| 3,882,868 A | 5/1975 | Tundermann | |
| 4,062,131 A | 12/1977 | Hsiung | |
| 4,186,499 A | 2/1980 | Massok, Jr. et al. | |
| 4,288,549 A | 9/1981 | Boeck et al. | |
| 4,694,483 A * | 9/1987 | Cheung | 379/265.06 |
| 5,287,505 A * | 2/1994 | Calvert et al. | |
| 5,465,508 A | 11/1995 | Bourdeau | |
| 5,467,391 A * | 11/1995 | Donaghue et al. | 379/266.08 |
| 5,625,682 A * | 4/1997 | Gray et al. | 379/207.16 |
| 5,825,869 A * | 10/1998 | Brooks et al. | 379/265.12 |
| 5,825,870 A * | 10/1998 | Miloslavsky | 379/265.01 |
| 5,828,747 A * | 10/1998 | Fisher et al. | 379/265.12 |
| 5,898,767 A * | 4/1999 | Cave | 379/211.03 |
| 5,903,641 A * | 5/1999 | Tonisson | 379/265.12 |
| 5,915,011 A * | 6/1999 | Miloslavsky | 379/219 |
| 5,963,911 A * | 10/1999 | Walker et al. | 705/7.12 |
| 6,032,184 A * | 2/2000 | Cogger et al. | 709/223 |
| 6,044,497 A | 4/2000 | Richardson | |
| 6,052,460 A * | 4/2000 | Fisher et al. | 379/265.12 |
| 6,134,530 A * | 10/2000 | Bunting et al. | 705/7.25 |
| 6,147,975 A * | 11/2000 | Bowman-Amuah | 370/252 |
| 6,177,932 B1 * | 1/2001 | Galdes et al. | 715/733 |
| 6,219,648 B1 * | 4/2001 | Jones et al. | 705/8 |
| 6,260,048 B1 * | 7/2001 | Carpenter et al. | |
| 6,324,282 B1 * | 11/2001 | McIllwaine et al. | 379/265.06 |
| 6,336,227 B1 | 1/2002 | Liput et al. | |
| 6,424,709 B1 * | 7/2002 | Doyle et al. | 379/265.02 |

(Continued)

OTHER PUBLICATIONS

TrtackWise—User's Guide Sparta Systems, inc., 2000.*

(Continued)

*Primary Examiner* — Thomas L Mansfield
(74) *Attorney, Agent, or Firm* — Lowenstein Sandler LLP

(57) ABSTRACT

An embodiment relates generally to a method of providing visibility in technical support. The method includes providing for a plurality of technical groups, each group specializing in a technical area and is comprised of a plurality of senior and junior members. The method also includes receiving a technical issue from a user to be resolved by a selected technical group of the plurality of technical groups and providing access to the user in a process of resolving the technical issue by the selected technical group.

17 Claims, 7 Drawing Sheets

(56) References Cited

U.S. PATENT DOCUMENTS

| | | | |
|---|---|---|---|
| 6,481,120 B1 | 11/2002 | Xia et al. | |
| 6,510,221 B1* | 1/2003 | Fisher et al. | 379/265.12 |
| 6,587,556 B1* | 7/2003 | Judkins et al. | 379/219 |
| 6,639,982 B1* | 10/2003 | Stuart et al. | 379/266.03 |
| 6,724,884 B2* | 4/2004 | Jensen et al. | 379/265.01 |
| 6,763,333 B2* | 7/2004 | Jones et al. | 705/8 |
| 6,766,012 B1* | 7/2004 | Crossley | 379/265.02 |
| 6,766,539 B1 | 7/2004 | Huber | |
| 6,789,109 B2* | 9/2004 | Samra et al. | 709/220 |
| 6,807,269 B1* | 10/2004 | Atwood et al. | 379/220.01 |
| 6,868,370 B1* | 3/2005 | Burbridge et al. | 703/1 |
| 6,871,322 B2* | 3/2005 | Gusler et al. | 715/708 |
| 6,879,586 B2* | 4/2005 | Miloslavsky et al. | 370/356 |
| 6,937,715 B2* | 8/2005 | Delaney | 379/265.09 |
| 6,978,006 B1* | 12/2005 | Polcyn | 379/265.12 |
| 6,990,458 B2* | 1/2006 | Harrison et al. | 705/7.14 |
| 7,023,979 B1* | 4/2006 | Wu et al. | 379/265.11 |
| 7,027,463 B2* | 4/2006 | Mathew et al. | 370/463 |
| 7,085,831 B2* | 8/2006 | Larkin | 709/223 |
| 7,092,888 B1* | 8/2006 | McCarthy et al. | 704/277 |
| 7,110,525 B1* | 9/2006 | Heller et al. | 379/265.11 |
| 7,158,628 B2* | 1/2007 | McConnell et al. | 379/265.02 |
| 7,159,237 B2* | 1/2007 | Schneier et al. | 726/3 |
| 7,225,139 B1* | 5/2007 | Tidwell et al. | 705/7.15 |
| 7,266,734 B2* | 9/2007 | Chavez et al. | 714/48 |
| 7,289,605 B1* | 10/2007 | Jean et al. | 379/32.01 |
| 7,330,822 B1* | 2/2008 | Robson et al. | 705/9 |
| 7,353,230 B2 | 4/2008 | Hamilton et al. | |
| 7,366,731 B2* | 4/2008 | Lewis et al. | |
| 7,406,515 B1* | 7/2008 | Joyce et al. | 709/224 |
| 7,610,213 B2* | 10/2009 | Jones et al. | 705/8 |
| 7,634,598 B2 | 12/2009 | Kim et al. | |
| 7,657,436 B2* | 2/2010 | Elmore et al. | 705/1.1 |
| 7,663,479 B1* | 2/2010 | Bajpay et al. | 340/506 |
| 7,730,005 B2* | 6/2010 | Gilliam et al. | 706/45 |
| 7,734,783 B1* | 6/2010 | Bourke et al. | 709/226 |
| 7,783,029 B2* | 8/2010 | Whitecotten et al. | 379/265.06 |
| 7,783,755 B2 | 8/2010 | Goss et al. | |
| 7,899,177 B1* | 3/2011 | Bruening et al. | 379/265.05 |
| 7,984,007 B2* | 7/2011 | Reumann et al. | 706/48 |
| 8,005,700 B2* | 8/2011 | Amitabh et al. | 705/7.11 |
| 8,023,638 B2* | 9/2011 | Waalkes et al. | 379/266.07 |
| 8,024,214 B2* | 9/2011 | Ellis et al. | 705/7.29 |
| 8,054,965 B1* | 11/2011 | Wu et al. | 379/265.11 |
| 8,065,682 B2* | 11/2011 | Baryshnikov et al. | 718/104 |
| 8,126,133 B1* | 2/2012 | Everingham et al. | 379/265.01 |
| 8,160,234 B2* | 4/2012 | Diethorn | 379/265.11 |
| 8,195,488 B1* | 6/2012 | Taix et al. | 705/7.11 |
| 8,285,578 B2* | 10/2012 | Sheppard | 705/7.13 |
| 8,560,369 B2* | 10/2013 | Messer | 705/7.14 |
| 8,634,541 B2* | 1/2014 | Flockhart et al. | 379/265.12 |
| 2001/0001143 A1* | 5/2001 | Jones et al. | 705/1 |
| 2001/0051890 A1* | 12/2001 | Burgess | 705/9 |
| 2002/0032597 A1* | 3/2002 | Chanos | 705/10 |
| 2002/0123983 A1* | 9/2002 | Riley et al. | 707/1 |
| 2003/0007628 A1 | 1/2003 | Vortman et al. | |
| 2003/0083941 A1 | 2/2003 | Moran et al. | |
| 2003/0135403 A1* | 7/2003 | Sanderson et al. | 705/8 |
| 2003/0167199 A1* | 9/2003 | Thomann et al. | 705/10 |
| 2003/0172133 A1* | 9/2003 | Smith et al. | 709/219 |
| 2003/0182652 A1* | 9/2003 | Custodio | 717/122 |
| 2004/0210469 A1* | 10/2004 | Jones et al. | 705/8 |
| 2004/0243458 A1* | 12/2004 | Barkan | 705/9 |
| 2004/0249786 A1* | 12/2004 | Dabney et al. | 707/1 |
| 2005/0010461 A1* | 1/2005 | Manos | 705/8 |
| 2005/0039192 A1* | 2/2005 | Chavez et al. | 719/318 |
| 2005/0043986 A1* | 2/2005 | McConnell et al. | 705/11 |
| 2005/0047579 A1 | 3/2005 | Salame | |
| 2005/0060217 A1* | 3/2005 | Douglas et al. | 705/9 |
| 2005/0083915 A1* | 4/2005 | Mathew et al. | 370/352 |
| 2005/0131750 A1* | 6/2005 | Kogan et al. | 705/9 |
| 2006/0039547 A1* | 2/2006 | Klein et al. | 379/265.02 |
| 2006/0115070 A1* | 6/2006 | Bushey et al. | 379/265.02 |
| 2006/0153356 A1* | 7/2006 | Sisselman et al. | 379/265.12 |
| 2006/0184883 A1* | 8/2006 | Jerrard-Dunne et al. | 715/742 |
| 2006/0241957 A1* | 10/2006 | Boswell | 705/1 |
| 2006/0282530 A1* | 12/2006 | Klein et al. | 709/224 |
| 2007/0116185 A1* | 5/2007 | Savoor et al. | 379/9 |
| 2007/0174390 A1* | 7/2007 | Silvain et al. | 709/204 |
| 2007/0208572 A1* | 9/2007 | Habichler et al. | 705/1 |
| 2007/0265873 A1 | 11/2007 | Sheth et al. | |
| 2007/0288800 A1* | 12/2007 | Chavez et al. | 714/39 |
| 2007/0299953 A1* | 12/2007 | Walker et al. | 709/223 |
| 2008/0021755 A1 | 1/2008 | Jones et al. | |
| 2008/0034060 A1 | 2/2008 | Fisher, Jr. | |
| 2008/0042987 A1* | 2/2008 | Westerman et al. | 345/173 |
| 2008/0056233 A1* | 3/2008 | Ijidakinro et al. | 370/352 |
| 2008/0091983 A1* | 4/2008 | Boss et al. | 714/48 |
| 2008/0144525 A1* | 6/2008 | Crockett et al. | 370/254 |
| 2008/0144803 A1* | 6/2008 | Jaiswal et al. | 379/265.12 |
| 2008/0155564 A1* | 6/2008 | Shcherbina et al. | 719/318 |
| 2008/0162688 A1* | 7/2008 | Reumann et al. | 709/224 |
| 2008/0195694 A1* | 8/2008 | Alaniz et al. | 709/203 |
| 2008/0209279 A1 | 8/2008 | Van Riel et al. | |
| 2008/0225872 A1 | 9/2008 | Collins et al. | |
| 2008/0228692 A1* | 9/2008 | Wannemacher et al. | 707/1 |
| 2008/0263077 A1* | 10/2008 | Boston | 707/102 |
| 2008/0288267 A1 | 11/2008 | Asher et al. | |
| 2009/0012838 A1 | 1/2009 | DeJong et al. | |
| 2009/0018890 A1* | 1/2009 | Werth et al. | 705/9 |
| 2009/0034696 A1* | 2/2009 | Ramanathan | 379/88.17 |
| 2009/0043669 A1* | 2/2009 | Hibbets et al. | 705/26 |
| 2009/0049133 A1 | 2/2009 | Odom et al. | |
| 2009/0063175 A1 | 3/2009 | Hibbets et al. | |
| 2009/0094091 A1* | 4/2009 | Thieret et al. | 705/9 |
| 2009/0119147 A1 | 5/2009 | Messer | |
| 2009/0138510 A1* | 5/2009 | Childress et al. | 707/104.1 |

OTHER PUBLICATIONS

Choosing and Issue and Change Management Tool—White Paper Merant, 1999, Retrieved from Archive.org.*

Merant PVCS Tracking—Issue and Change Management Solution—Reviewers Guide Merant, Aug. 2000, Retrieved from Archive.org.*

Yee, Ka-Ping, Roundup—An Issue Tracking System for Knowledge Workers 2000.*

Duioit, Allen H. et al., Using an issue-based model in a team-based software engineering course IEEE, 1996.*

Unipress.com—Footprints Unipress, Nov. 2000, Retrieved from Archive.org Oct. 2005.*

Serrano, Nicloas et al., Buzgilla, ITracker and Other Bug Trackers IEEE Software, Mar./Apr. 2005.*

Altriis Helpdesk Solution 6,0 SP2—Product Guide Altiris, Inc., Jan. 31, 2005.*

Remedy Help Desk 5.5 User's Guide Remedy, Jun. 2003.*

BMC Remedy Service Desk: Incident Management 7.0 User's Guide BMC Software, Jun. 2006.*

Trouble Ticket Express—Operator Manual rev 1.0 United Web Coders, 2006.*

CentreVu Advocate Release 9 User Guide Avaya Communications, Dec. 2000.*

Collins, John E. et al., Automated Assignment and Scheduling of Service Personnel IEEE, Apr. 2004.*

LeSaint, David et al., Dynamic Workforce Scheduling for British Telecommunications plc Interface, vol. 30, No. 1, Jan./Feb. 2000.*

Avaya Call Center Release 3.1—Call Vectoring and Expert Agent Selection (EAS) Guide Avaya Communications, Feb. 2006.*

Definity Enterprise Communication Server Release 9—Call Vectoring/Expert Agent Selection (EAS) Guide Avaya Communicaiton, Inc., Issue 5, Nov. 2000.* e11 Help Desk User Manual—Representative Section Version 4.4 Value one, 2005.*

NetSupport DNA Helpdesk v2.70—Manual NetSupport, LTD., 2007.*

Bugs Manager Version 1.0—User Guide Early Impact, LLC., Jul. 13, 2003.*

Merant Tracker—Product Overview Merant, 2003.*

TrackStudo Enterprise 3.1, 2005.*

Anvik, John et al., Who Should Fix This Bug? ACM ICSE'06, May 20-28, 2006.*

(56) References Cited

OTHER PUBLICATIONS

Carroll, John M. et al., Notification and awareness: synchronizing task-oriented collaborative activity International Journal of Human-Computer Studies, vol. 58, 2003.*

ElementTool.com Web Pages Elemental, Apr. 2005, Retrieved from Archive.org Jan. 21, 2014.*

TrackStudo.com—Product Features—Web Pages Trackstudio, May 2005, Retrieved from Archive.org. Jan. 21, 2014.*

"Problem Management and Escalation Process" (2006) Symantec Corporation.

"WebCrossing Announces New Support Crossing Solution; Customer and Technical Support Oriented Online Community Solution for Cost-Effective Support and Customer Feedback" (2001) Business Editors and High Tech Writers. Business Wire.

USPTO; Office Action for U.S. Appl. No. 11/933,532, dated Jan. 20, 2012.

USPTO; Office Action for U.S. Appl. No. 11/933,532, dated Mar. 9, 2011.

USPTO; Office Action for U.S. Appl. No. 11/933,532, dated Jun. 28, 2011.

USPTO; NonFinal Office Action for U.S. Appl. No. 11/933,532, dated May 1, 2012.

USPTO; Advisory Action for U.S. Appl. No. 11/933,532, dated Jul. 3, 2012.

USPTO; Office Action for U.S. Appl. No. 11/933,532, dated Sep. 17, 2012.

USPTO; Office Action for U.S. Appl. No. 11/933,532, dated Jan. 10, 2013.

USPTO; Notice of Allowance for U.S. Appl. No. 11/933,532, dated Jun. 14, 2013.

\* cited by examiner

WEB-BASED TECHNICAL ISSUE ASSIGNMENTS BASED ON TECHNICAL SUPPORT GROUPS HAVING HANDLED A HIGHEST NUMBER OF TECHNICAL REQUESTS

RELATED APPLICATION

This application is related to co-pending U.S. patent application Ser. No. 11/933,532 filed on Nov. 1, 2007, entitled "Systems And Methods For Technical Support Based On A Flock Structure." The content of the above mentioned commonly assigned, co-pending U.S. patent application is hereby incorporated herein by reference for all purposes.

FIELD

His invention relates generally to technical support, more particularly, to systems and methods for technical support based on a flock structure.

DESCRIPTION OF THE RELATED ART

Computers and software have become critical tools in today's information based society. Computers and software have provided tools to users to greatly increase work efficiencies. However, with the advantages provided by computers and software come occasional technical problems associated with the computers and software applications. A typical solution to a computer and/or software technical problem is to contact technical support of the company that provided the computer and/or software.

Technical support departments are typically organized in a funnel structure. More particularly, the funnel structure is based on having a large number of generalists to intake the reported problem and attempt to resolve the reported problem. Above the generalists, there is a smaller number technical experts. If the first level of support, the generalists, cannot resolve the problem, the generalist can then escalate the reported problem to the technical experts for resolution. When the problem is resolved by the technical expert, the resolution is forwarded to the generalist to report back to the report user.

However, as products evolve and become increasing complex, it is becoming apparent that the generalists or first level of support are becoming less equipped to handle the reported issues as the products demand an increasing knowledge of specialized areas. In effect, the technical support issues are demanding the generalist to have more breadth of knowledge as well an increasing depth of knowledge. Ultimately, this can lead to a situation of hiring entry level associates (at entry level prices) will become problematic since the wide range of expertise required in a single person. Accordingly, there is a need in the art for a way to provide resolution of technical issue without demanding for specialized skills and a wide breadth of knowledge for entry level technical support personnel.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of information and service portals, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments generally relate to methods and systems for a novel technical support model that provides enhanced service and visibility for an end user. More particularly, a flock structure can be implemented to support the products of a technical entity. The flock structure can be organized around product or component skill specialization, i.e., a specialized group of senior and junior technical support staff focused on a specific areas. A logical router can be configured to rout an incoming technical issue to an appropriate technical group to resolve the technical issue either via web site or via telephone. The technical issue is assigned to a flock member, who takes ownership of the issue. The technical issue can also be logged into an issue tracker module. The issue tracker module can then be configured to issue notification to the rest of the flock members to provide attention to the technical issue. Outside members of the flock can subscribe to a mailing list provide by the issue tracker module to become fully informed about the issue as well to participate in the issue resolution.

The flock structure can also provide greater visibility for an end user. More particularly, the issue tracker can be further configured to provide access to the mailing list to the user in order for the user to monitor the progress of his technical issue. Moreover, the user is automatically subscribed to the mailing list to provide even greater visibility.

Figure 1:
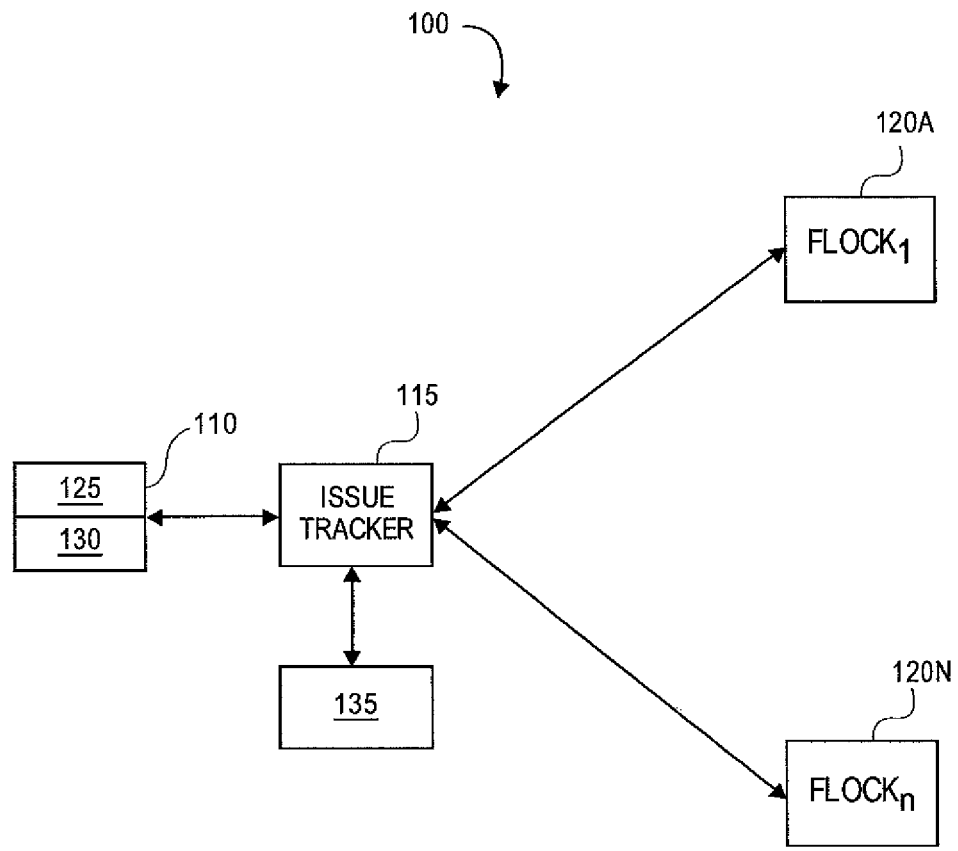
FIG. 1 depicts an exemplary system in accordance with an embodiment.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified. Moreover, the system 100 may be implemented using software components, hardware components, or combinations thereof.

As shown in FIG. 1, the system 100 includes a logical router 110, a case management system 115, and flocks 120. The logical router 110 can be configured to direct requests for technical assistance to the appropriate flock 120. The logical router 110 can comprise of two components: a telephone router module 125 and a web router module 130.

The telephone router module 125 module can be configured to direct telephone calls to a selected flock 120 based on a telephone routing algorithm based on probability. More particularly, the telephone routing algorithm monitors the received telephone calls. The flock 120 that receives the highest percentage of calls can be deemed the highest probability. The flock 120 that receives the second highest percentage of calls can be deemed the second highest probability and so forth to the flock that receives the lowest percentage of calls can be deemed the lowest probability. Accordingly, a telephone call for technical assistance is then routed to the flock 120 with the highest probability. A first available member in the selected flock 120 can then process the telephone call, i.e., accept the telephone ticket as a technical issue or route the telephone call to the appropriate flock 120.

The web router module 130 can be configured to route users using a web service and/or website to technical support. More particularly, a user can access a web service and/or website for technical assistance. The web service can display a graphical user interface such as a web page that queries the user for the type of assistance and the associated product and/or service. The web service can then forward the received information to the web router module 130. Subsequently, the web router module 130 can then direct the request for assistance to the appropriate flock 120.

The case management system (or issue tracker) 115 can be configured to manage the technical issue from start to resolution. More particularly, the case management system 115 can log a request for technical assistance as a support ticket. The support ticket can then be assigned to a support person such as an engineer, specialist, etc. The case management system 115 can then receive status updates from the engineer/specialist as to the resolution of the technical issue. Subsequently, the case management system 115 can close the support ticket when the technical issue has been resolved and the solution posted to the support ticket by the assigned engineer. Case management systems are generally well known systems such as Numara Help Desk™, Sinergia Help Desk™, Issue Tracker, etc.

The case management system 115 can also comprise a flock module 135. The flock module 135 can be configured to provide the infrastructure to implement the flock model of support. More particularly, the flock module 135 can be configure to maintain and manage the flocks 120A-N. Each flock 120 can comprise of junior and senior members of a technical staff where each member may not be geographically co-located in the same location. A junior member can be engineer/specialist from entry-level to about five years of experience. A senior member can also be an engineer/specialist with over five years of experience. The differentiation between junior and senior members can be a user-defined parameter. Each flock 120 can also be organized around a particular skill, product, or service. For example, in some implementations of the flock model, one flock can be assigned to an application stack, a second flock can be assigned to virtualization, a third flock can be assigned to a file system, etc. In other embodiments, the composition of the flock can be user determined.

Accordingly, the flock module 135 can be configured to maintain a mailing list that includes the junior and senior members for each flock 120. As a ticket is assigned to a member of a flock 120, the flock module 135 can be configured to transmit a notification message that notifies the flock 120 of a new technical issue associated with the new ticket. Any member of a flock 120 can post a message to the ticket, which is then forwarded to the rest of the members of the flock 120 by the flock module 135. The flock module 135 can also forward a copy of the post to the ticket to the reporting user of the associated technical issue in order to provide visibility to the resolution process of the flock 120.

The flock module 135 can also be configured to send notification messages to interested third parties. Examples of interested third parties can be a product development team, an engineering team, a quality assurance team, etc.

For any interested third parties, the flock module 135 can be configured to maintain a subscription link for each open support ticket. More specifically, when the case management system 115 instantiates a new support ticket, the flock module 135 can create a subscription link associated with the support ticket. Accordingly, an interested party can activate the subscription link to receive status updates, posts, or other activity associated with the support ticket as well as participate in the resolution of the support ticket. In some embodiments, an instant messaging or short messaging system can supplement the subscription link. In various embodiments, the reporting user is also automatically included in the subscription link as to provide additional visibility into the resolution process.

Figure 2:
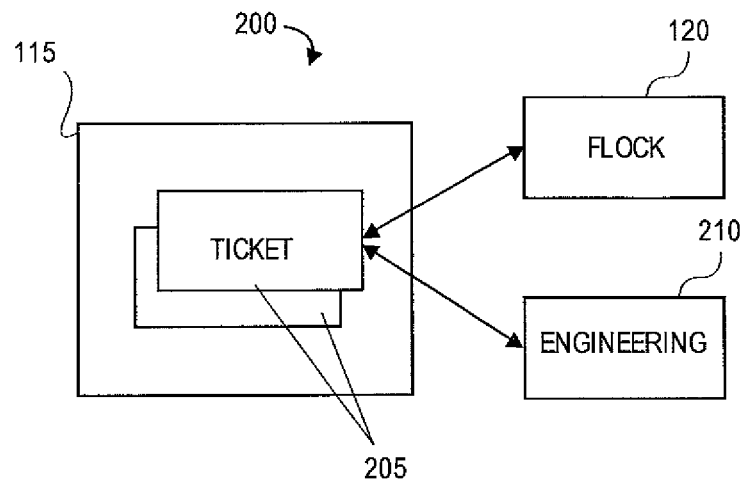
FIG. 2 illustrates an exemplary flock structure in accordance with another embodiment.

FIG. 2 depicts a diagram 200 of a flock associated with multiple tickets in accordance with another embodiment. As shown in FIG. 2, the support tickets 205 that have been associated with a selected flock 120 are routed to the selected flock 120 and are maintained in the case management system 115. The flock module 135 can be configured to forward any activity to each member of the selected flock 120 as well as to any interested members of the engineering team 210. The flock module 135 can use a mailing list as a mechanism to forward status messages, comments, etc, as well as to receive the same from the members of the selected flock 120.

Figure 3:
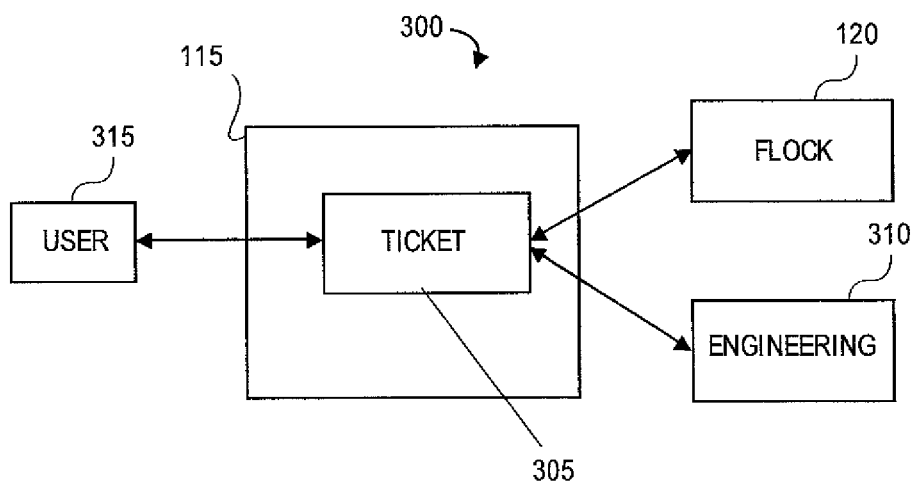
FIG. 3 depicts an exemplary distribution structure for a ticket in accordance with yet another embodiment.

FIG. 3 illustrates a diagram 300 of a user association with a ticket in a flock in accordance with yet another embodiment. As shown in FIG. 3, a support ticket 305 can be associated with a specific flock 120 as managed by the flock module 135. As part of the distribution list, the flock module 135 can also automatically include the reporting user 315 as well as any interested members of an engineering team 310 for the status updates, comments, posts, etc, of the support ticket 305. Accordingly, the reporting user 310 can have visibility in the resolution process of the reported technical issue by the specific flock 120.

Figure 4:
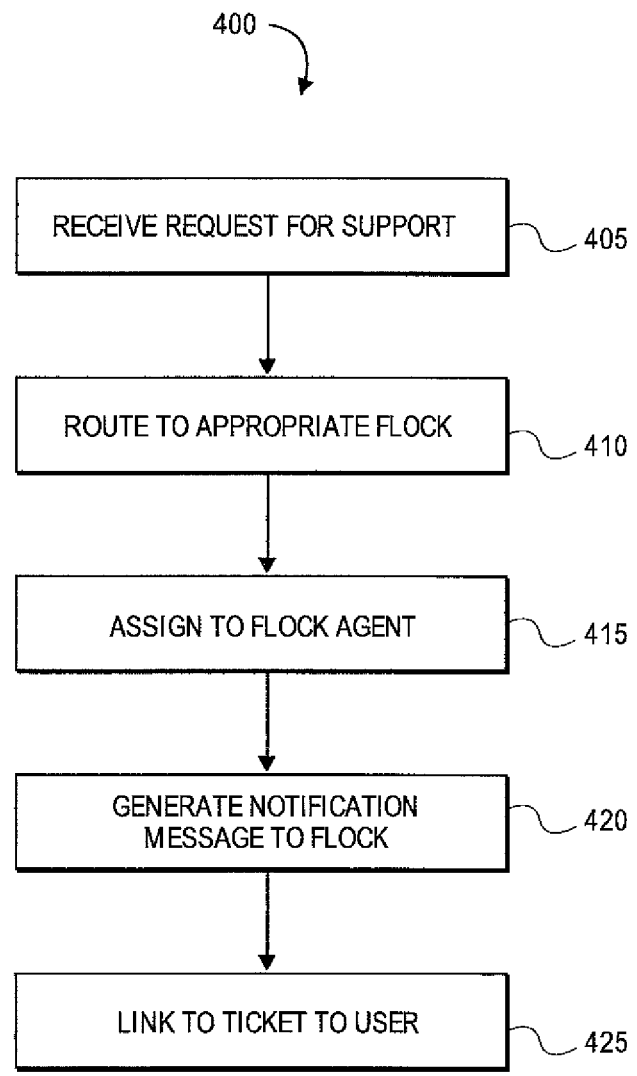
FIG. 4 illustrates an exemplary flow diagram for routing in accordance with yet another embodiment.

FIG. 4 depicts an exemplary flow diagram 400 for routing from a web request in accordance with yet another embodiment. It should be readily apparent to those of ordinary skill in the art that the flow diagram 400 depicted in FIG. 4 represents a generalized schematic illustration and that other steps may be added or existing steps may be removed or modified.

As shown in FIG. 4, the flock module 135 can be configured to receive a web request for assistance from a web service and/or website, in step 405. More particularly, a user can log-in to a web-site that provides technical support. After authentication and verification of entitlements to the technical support, a user can be directed to a graphical user interface such as a web page that is configured to query the user for the product and/or service and a description of the technical issue or problem. An example of this type of web page is shown in FIG. 5.

Figure 5:
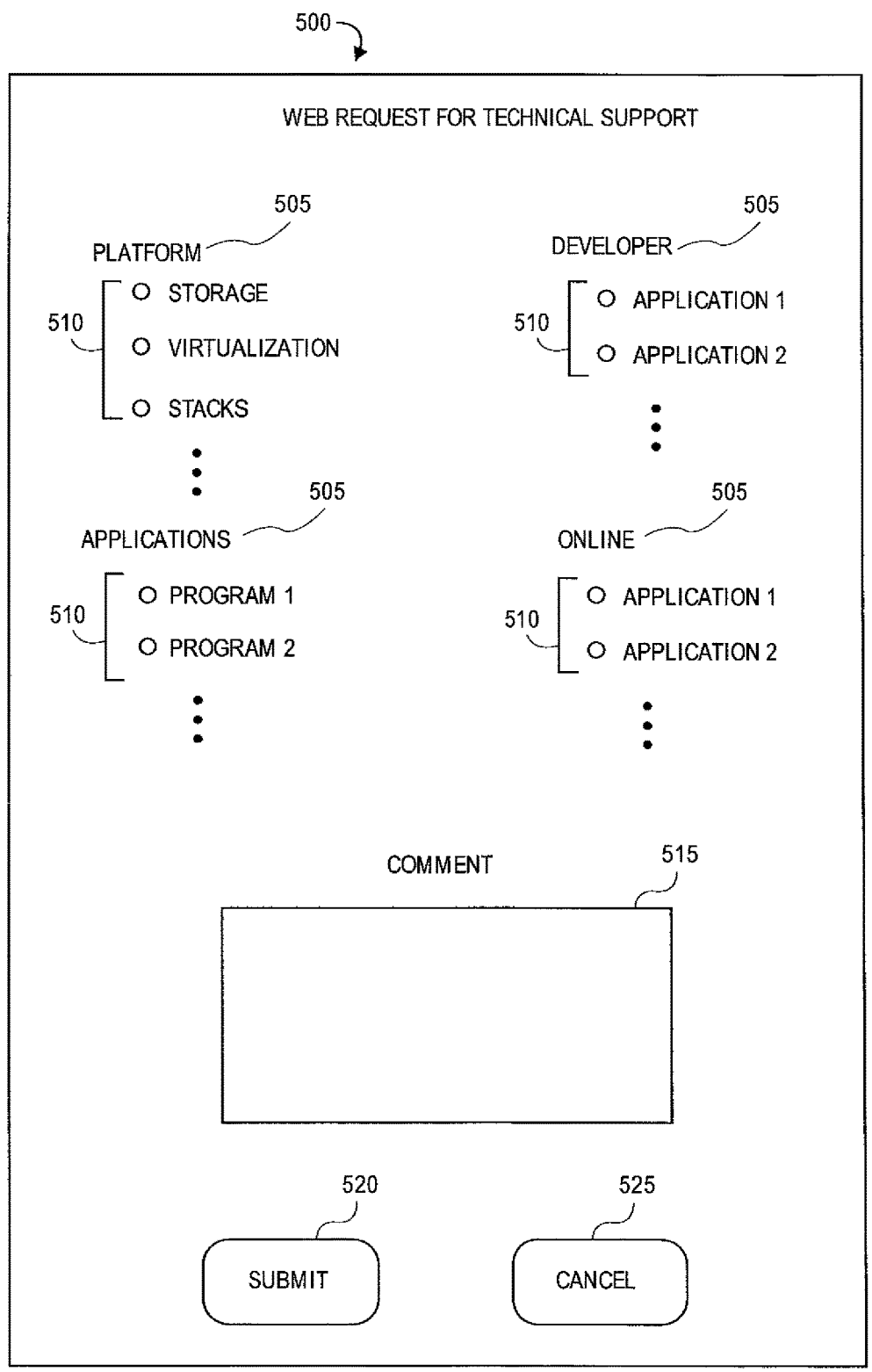
FIG. 5 depicts an exemplary graphical user interface for a technical support request in accordance with yet another embodiment.

FIG. 5 depicts an exemplary technical support request GUI 500 in accordance with yet another embodiment. The technical support request GUI 500 (hereinafter "GUI 500") is merely illustrative and other variations of the GUI 500 are well within the contemplated embodiments. The GUI 500 can be implemented as a graphical page implemented in XML, HTML, SGML, or other similar mark-up language.

As shown in, FIG. 5, the GUI 500 can comprise of product/service headings 505 which define the types of supported products/services. Under each product/service headings 505 are the respective supported products/services 510 with an associated selector buttons 510. A user can specify a particular product/service that the user would like to request assistance.

The GUI 500 can also comprise a comment box 515 that allows a user to describe in greater detail the problem with the selected product/service. The comment box 515 can be implemented as text box entry as known to those skilled in the art.

The GUI 500 can further comprise a submit button 520 and a cancel button 525. The submit button 520 can be configured to package the selection of the product/service along with the entered comment to the flock module 135 when activated. The cancel button 525 can be configured to return the user to the calling web page and discard any data when activated.

Returning to FIG. 4, in step 410, the flock module 135 can be configured to route the received web request to the appropriate flock 120 when the user activate the submit button 520 of the GUI 500.

In step 415, the flock module 135 can be configured to assign the web request to the first available technical support engineer. In other embodiments, the flock module 135 can assign any received web request based on a user-defined algorithm or heuristic such as first available junior member. The flock module 135 can also invoke that a support ticket be created in the case management system 115.

In step 420, the flock module 135 can be configure to generate a notification message to all the members (junior and senior) of the flock 120. More particularly, the notification message can comprise of information such as the support ticket reference number or identification, a description of the problem, the assigned member, and a request for the members to contribute any solutions to the problem. The notification message can also be sent to any interested third parties.

The flock module 135 can also be configure to create a subscription link for the interested third parties to participate in the resolution process of the support ticket. Accordingly, interest third parties can activate the subscription link to join the resolution process.

In step 425, the flock module 135 can provide the subscription link to the user. The user can then be informed of the progress of the reported problem as it is resolved by the flock 120, i.e., visibility, when the subscription link is activated.

Figure 6:
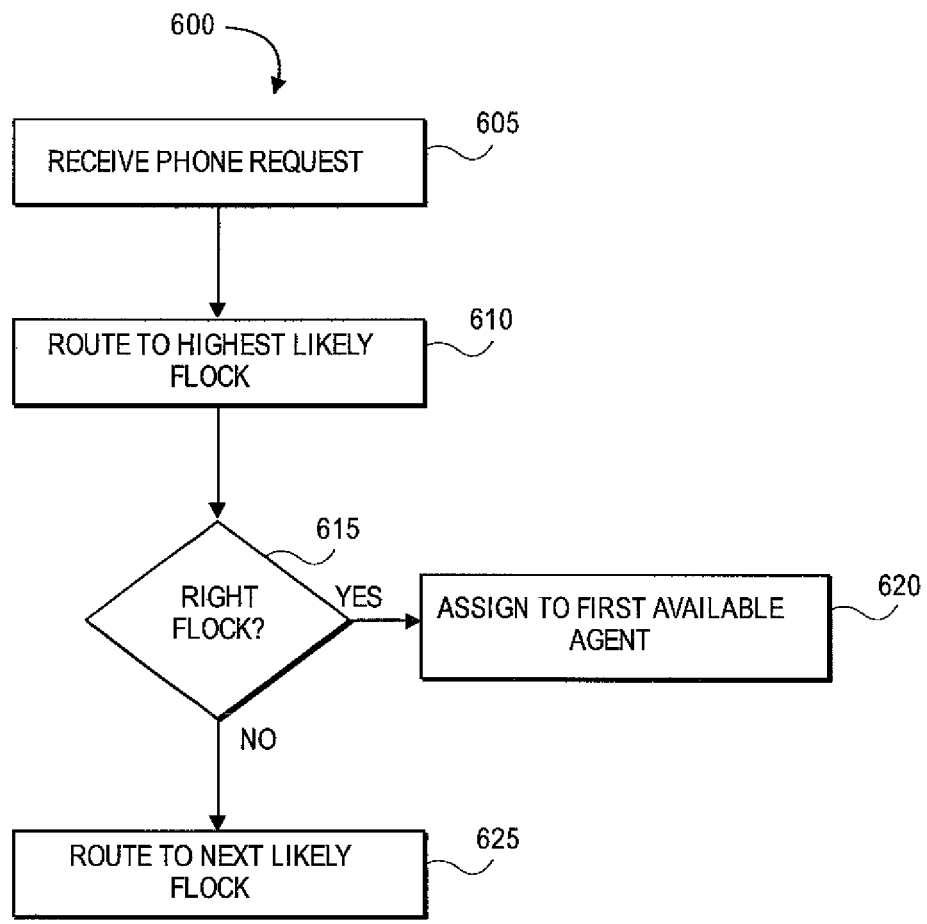
FIG. 6 illustrates an exemplary flow diagram for telephone routing in accordance with yet another embodiment.

FIG. 6 illustrates an exemplary flow diagram 600 executed by the telephone router module 125 in accordance with yet another embodiment. It should be readily apparent to those of ordinary skill in the art that the flow diagram 600 depicted in FIG. 6 represents a generalized schematic illustration and that other steps may be added or existing steps may be removed or modified.

As shown in FIG. 6, the telephone router module 125 can be configured to receive a telephone call from an existing telephone network, in step 605. The telephone router module 125 can then route the received telephone call to the highest likely flock 120 as previously described, in step 610.

In step 615, a first available service agent can answer the telephone call and determine whether the telephone call was directed to the right flock. In other embodiments, a user-defined algorithm/heuristic can be used to determine which member of the flock answers the telephone call.

If the telephone call was correctly routed, in step 615, the answering service agent is then assigned the technical issue associated with the telephone call, in step 620. The service agent can open a support ticket in the case management system 115. The flock module 135 can then forward the notification message to the rest of the flock as previously described with respect to FIG. 4. Otherwise, if the call was incorrectly routed to the flock, in step 615, the service agent can route the telephone call to the correct flock, in step 625.

Figure 7:
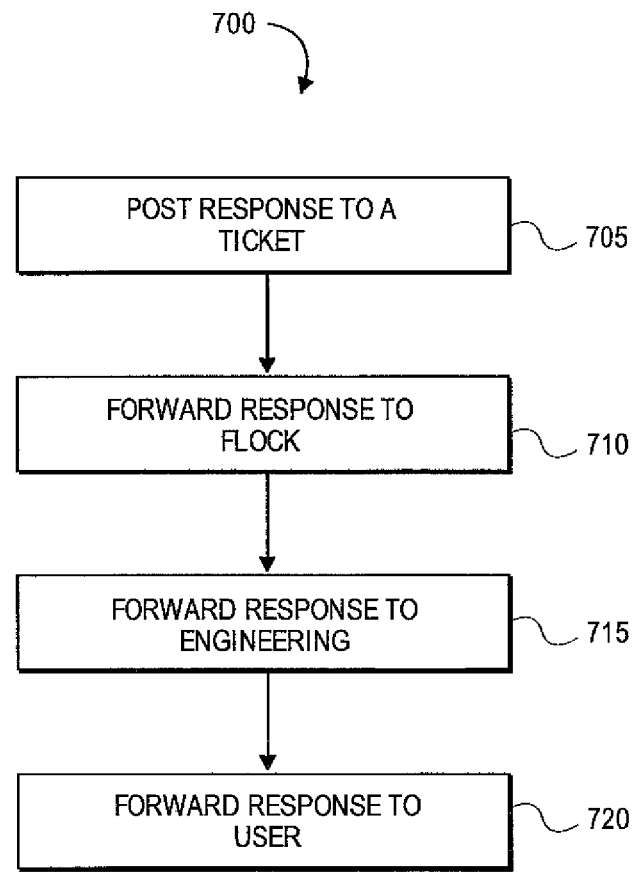
FIG. 7 depicts an exemplary flow diagram for distributing posts in accordance with yet another embodiment.

FIG. 7 illustrates an exemplary flow diagram 700 executed by the flock module 135 in accordance with yet another embodiment. It should be readily apparent to those of ordinary skill in the art that the flow diagram 700 depicted in FIG. 7 represents a generalized schematic illustration and that other steps may be added or existing steps may be removed or modified.

As shown in FIG. 7, the flock module 135 can be configured to receive a response for a support ticket, in step 705. The response can be a status update, a comment, a potential resolution post, etc. as provided by a member of the flock 120.

In step 710, the flock module 135 can then forward received response to the entire flock 120 to keep the members of the flock informed of the status of the support ticket. Similarly, in step 715, the flock module 135 can forward the received response to any interested third parties. Finally, in step 720, the flock module can forward the received response to the reporting user.

Figure 8:
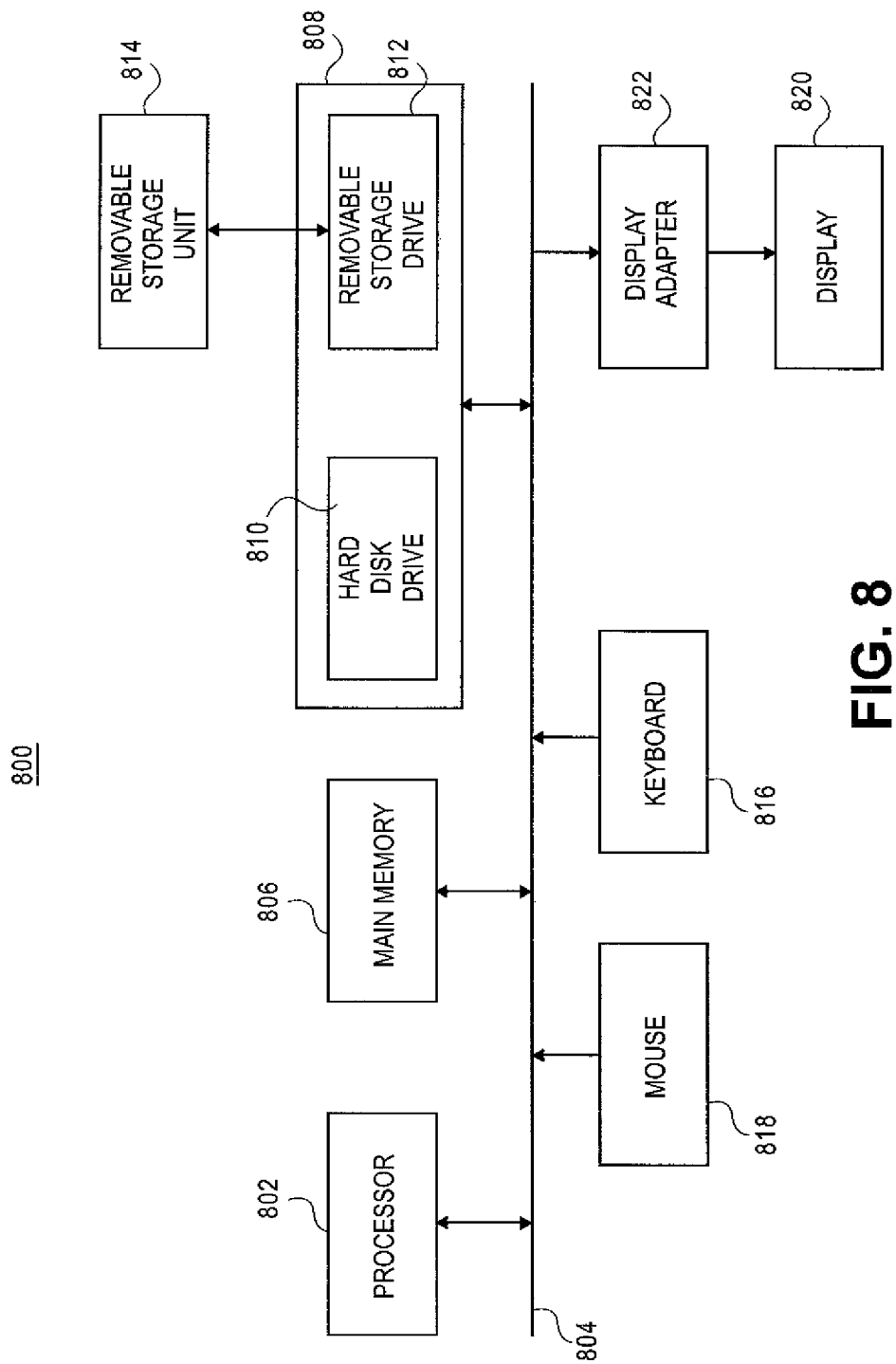
FIG. 8 depicts an exemplary computing platform in accordance with yet another embodiment.

FIG. 8 illustrates an exemplary block diagram of a computing platform 800 where an embodiment may be practiced. The functions of the flock module may be implemented in program code and executed by the computing platform 800. The flock module may be implemented in computer languages such as PASCAL, C, C++, JAVA, etc.

As shown in FIG. 8, the computer system 800 includes one or more processors, such as processor 802 that provide an execution platform for embodiments of the flock module 135. Commands and data from the processor 802 are communicated over a communication bus 804. The computer system 800 also includes a main memory 806, such as a Random Access Memory (RAM), where the flock module 130 may be executed during runtime, and a secondary memory 808. The secondary memory 808 includes, for example, a hard disk drive 810 and/or a removable storage drive 812, representing a floppy diskette drive, a magnetic tape drive, a compact disk drive, etc., where a copy of a computer program embodiment for the flock module 135 may be stored. The removable storage drive 812 reads from and/or writes to a removable storage unit 814 in a well-known manner. A user interfaces with the flock module 135 with a keyboard 816, a mouse 818, and a display 820. The display adapter 822 interfaces with the communication bus 804 and the display 820. The display adapter 822 also receives display data from the processor 802 and converts the display data into display commands for the display 820.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
    tracking, by a processing device, an amount of technical assistance requests handled by each of a plurality of technical groups, each of the plurality of technical groups to process technical assistance requests relating to technical issues of different types;
    generating a user interface comprising a plurality of selectable elements, each associated with at least one of a corresponding product or service;
    receiving a selection of at least one of the plurality of selectable elements, the selection representing a request for one of the plurality of technical groups to resolve a technical issue with the corresponding product or service, wherein each of the plurality of technical groups comprises at least one junior member and at least one senior member, the junior member having less experience than the senior member;
    obtaining a set of rules that define which of the plurality of technical groups an incoming technical assistance request is to be routed, the rules specifying that the incoming technical assistance request is to be routed to a technical group of the plurality of technical groups having a highest probability of resolving a corresponding technical issue;
    selecting, by the processing device, a selected technical group of the plurality of technical groups to resolve the technical issue by evaluating each of the plurality of technical groups against the set of rules to determine the technical group having the highest probability of resolving the technical issue based on a type of the technical issue and a technical group, of the plurality of technical groups, having handled a highest percentage of received technical assistance requests of the type;
    assigning the technical issue to a first available junior member of a plurality of members of the selected technical group;
    providing a notification to a rest of the plurality of members of the selected technical group, the rest of the plurality of members having not been assigned the technical issue, and the notification to indicate that the technical issue is assigned to the first member;
    generating a subscription link corresponding to the technical issue;
    providing the subscription link to one or more entities not associated with the technical group, the one or more entities including a user who issued the incoming technical assistance request;
    detecting an activation of the subscription link by at least one of the one or more entities; and
    providing information to the at least one of the one or more entities, the information comprising at least one of a status update, post, or activity pertaining to resolution of the technical issue.

2. The method of claim 1, further comprising:
    logging the technical issue into an issue tracker module; and
    instantiating a ticket for the technical issue.

3. The method of claim 2, further comprising notifying a rest of the selected technical group with the issue tracker module of the ticket.

4. The method of claim 3, further comprising providing at least one comment associated with the technical issue to the ticket from the rest of the technical group and the user.

5. A system comprising:
    a logical router to:
        generate a user interface comprising a plurality of selectable elements, each associated with at least one of a corresponding product or service,
        receive selections of at least one of the plurality of selectable elements, the selections representing requests for technical assistance from a web service and a telephone network for the corresponding product or service,
        track an amount of technical assistance requests handled by each group of a plurality of technical groups, each of the plurality of technical groups to process technical assistance requests relating to technical issues of different types, wherein each of the plurality of technical groups comprises at least one junior member and at least one senior member, the junior member having less experience than the senior member,
        obtain a set of rules that define which of the plurality of technical groups an incoming technical assistance request is to be routed, the rules specifying that the incoming technical assistance request is to be routed to a technical group of the plurality of technical groups having a highest probability of resolving a corresponding technical issue;
        select a selected technical group of the plurality of technical groups to resolve the technical issue by evaluating each of the plurality of technical groups against the set of rules to determine the technical group having the highest probability of resolving a technical issue based on a type of the technical issue and a technical group, of the plurality of technical groups, having handled a highest percentage of received technical assistance requests of the type; and assign a technical assistance request having a technical issue of the type to a first available junior member of a plurality of members of the selected technical group; and an issue tracker module, coupled to the logical router, the issue tracker module to:

instantiate a respective ticket for each received request for technical assistance, manage the respective ticket to resolution and provide a notification to a rest of the plurality of members of the selected technical group, the rest of the plurality of members having not been assigned the technical issue, and the notification to indicate that the technical assistance request is assigned to the first member, generate a subscription link corresponding to the technical issue, provide the subscription link to one or more entities not associated with the technical group, the one or more entities including a user who issued the incoming technical assistance request, detect an activation of the subscription link by at least one of the one or more entities, and provide information to the at least one of the one or more entities, the information comprising at least one of a status update, post, or activity pertaining to resolution of the technical issue.

6. The system of claim 5, wherein the issue tracker module to broadcast a notification message to notify the members of the selected technical group and the user and to request a resolution of a request for assistance.

7. The system of claim 5, wherein the issue tracker module to receive a post from an interested party and broadcast the post to the members of the selected technical group and the user.

8. The system of claim 5, wherein the issue tracker module to receive the post from a member of the selected technical group.

9. The system of claim 8, wherein the issue tracker module to broadcast the post to the members of the selected technical group and the user, and wherein the issue tracker module to provide visibility to the user requesting technical assistance from the selected technical group from the plurality of technical groups.

10. An apparatus comprising:
a routing module to:
generate a user interface comprising a plurality of selectable elements, each associated with at least one of a corresponding product or service, receive selections of at least one of the plurality of selectable elements, the selections representing requests for technical assistance from a web site and a telephone network for the corresponding product or service, track an amount of technical assistance requests handled by each group of a plurality of technical groups, each of the plurality of technical groups to process technical assistance requests relating to technical issues of different types, wherein each of the plurality of technical groups comprises at least one junior member and at least one senior member, the junior member having less experience than the senior member, obtain a set of rules that define which of the plurality of technical groups an incoming technical assistance request is to be routed, the rules specifying that the incoming technical assistance request is to be routed to a technical group of the plurality of technical groups having a highest probability of resolving a corresponding technical issue, select a selected technical group of the plurality of technical groups to resolve the technical issue by evaluating each of the plurality of technical groups against the set of rules to determine the technical group having the highest probability of resolving a technical issue based on a type of the technical issue and a technical group, of the plurality of technical groups, having handled a highest percentage of received technical assistance requests of the type, and assign a technical assistance request having a technical issue of the type to a first available junior member of a plurality of members of the selected technical group; and a case management system to:

instantiate a respective ticket for each received request for technical assistance, manage the respective ticket to resolution, and provide a notification to a rest of the plurality of members of the selected technical group, the rest of the plurality of members having not been assigned the technical issue, and the notification to indicate that the technical assistance request is assigned to the first member, wherein the case management system is coupled to the routing module generate a subscription link corresponding to the technical issue, provide the subscription link to one or more entities not associated with the technical group, the one or more entities including a user who issued the incoming technical assistance request, detect an activation of the subscription link by at least one of the one or more entities, and provide information to the at least one of the one or more entities, the information comprising at least one of a status update, post, or activity pertaining to resolution of the technical issue.

11. The apparatus of claim 10, wherein the case management system to broadcast a notification message to notify the members of the selected group and the user and to request a resolution of a request for assistance.

12. The apparatus of claim 10, wherein the case management system to receive the post from an interested party and broadcast the post to the members of the selected group and the user.

13. The apparatus of claim 10, wherein the case management system to receive the post from a member of the selected technical group.

14. The apparatus of claim 13, wherein the case management system to broadcast the post to the members of the selected group and the user.

15. A non-transitory computer readable storage medium storing instructions which, when executed by a processing device, cause the processing device to:

track, by the processing device, an amount of technical assistance requests handled by each of a plurality of technical groups, each of the plurality of technical groups to process technical assistance requests relating to technical issues of different types;

generate a user interface comprising a plurality of selectable elements, each associated with at least one of a corresponding product or service;

receive a selection of at least one of the plurality of selectable elements, the selection representing a request for one of the plurality of technical groups to resolve a technical issue with the corresponding product or service, wherein each of the plurality of technical groups comprises at least one junior member and at least one senior member, the junior member having less experience than the senior member;

obtain a set of rules that define which of the plurality of technical groups an incoming technical assistance request is to be routed, the rules specifying that the incoming technical assistance request is to be routed to a technical group of the plurality of technical groups having a highest probability of resolving a corresponding technical issue;

select a selected technical group of the plurality of technical groups to resolve the technical issue by evaluating each of the plurality of technical groups against the set of rules to determine the technical group having the highest probability of resolving the technical issue based on a type of the technical issue and a technical group, of the plurality of technical groups, having handled a highest percentage of received technical assistance requests of the type;

assign the technical issue to a first available junior member of a plurality of members of the selected technical group;

provide a notification to a rest of the plurality of members of the selected technical group, the rest of the plurality of members having not been assigned the technical issue, and the notification to indicate that the technical issue is assigned to the first member;

generate a subscription link corresponding to the technical issue;

provide the subscription link to one or more entities not associated with the technical group, the one or more entities including a user who issued the incoming technical assistance request;

detect an activation of the subscription link by at least one of the one or more entities, and provide information to the at least one of the one or more entities, the information comprising at least one of a status update, post, or activity pertaining to resolution of the technical issue.

16. The non-transitory computer readable storage medium of claim 15, the processing device further to:

log the technical issue into an issue tracker module; and instantiate a ticket for the technical issue.

17. The non-transitory computer readable storage medium of claim 16, the processing device further to:

notify the rest of the selected technical group with the issue tracker module of the ticket.

* * * * *